(12) United States Patent
Li (10) Patent No.: US 11,057,304 B1
(45) Date of Patent: Jul. 6, 2021

(54) DNS (DOMAIN NAME SERVER)-BASED APPLICATION-AWARE ROUTING ON SD-WAN (SOFTWARE-DEFINED WIDE ACCESS NETWORK)

(71) Applicant: Fortinet, Inc., Sunnyvale, CA (US)

(72) Inventor: Peixue Li, Cupertino, CA (US)

(73) Assignee: Fortinet, Inc., Sunnyvale, CA (US)

( * ) Notice: Subject to any disclaimer, the term of this patent is extended or adjusted under 35 U.S.C. 154(b) by 27 days.

(21) Appl. No.: 16/724,334

(22) Filed: Dec. 22, 2019

(51) Int. Cl.
| | |
|---|---|
| *H04L 12/70* | (2013.01) |
| *H04L 12/741* | (2013.01) |
| *H04L 29/12* | (2006.01) |
| *H04W 72/04* | (2009.01) |
| *H04W 84/12* | (2009.01) |

(52) U.S. Cl.
CPC .......... *H04L 45/74* (2013.01); *H04L 61/1511* (2013.01); *H04W 72/04* (2013.01); *H04W 84/12* (2013.01)

(58) Field of Classification Search
CPC .... H04L 45/74; H04L 61/1511; H04W 72/04; H04W 84/12
See application file for complete search history.

(56) References Cited

U.S. PATENT DOCUMENTS

| | | | | |
|---|---|---|---|---|
| 2019/0081958 | A1* | 3/2019 | Lee | H04L 63/0209 |
| 2019/0320069 | A1* | 10/2019 | Ku | H04L 61/157 |
| 2020/0007457 | A1* | 1/2020 | Greenstein | H04L 41/0813 |
| 2020/0236219 | A1* | 7/2020 | Ku | H04L 61/157 |
| 2020/0274848 | A1* | 8/2020 | Sundararajan | H04L 45/22 |
| 2021/0067446 | A1* | 3/2021 | Ignatchenko | H04L 45/70 |
| 2021/0067455 | A1* | 3/2021 | Lahtiranta | H04L 47/2483 |
| 2021/0092005 | A1* | 3/2021 | Kaul | H04L 45/745 |

\* cited by examiner

*Primary Examiner* — Brian D Nguyen
(74) *Attorney, Agent, or Firm* — Law Office of Dorian Cartwright; Dorian Cartwright (57) ABSTRACT

Applications associated with the network data packet are identified by parsing the network data packet of the received network data packets to identify a second-level domain from a destination IP address and searching the second-level domain database to identify the application associated with the second-level domain. It is determined whether the network data packet comprises a DNS packet or a non-DNS packet. Responsive to the network data packet comprising a DNS packet, a second-level domain database in real-time is updated by storing the destination IP address in association with the second-level domain, the second-level domain associated with the application. Responsive to the network data packet comprising a non-DNS packet, a network policy for enforcement on the identified application and routing the network data packet in accordance with the network policy for the application is identified.

7 Claims, 7 Drawing Sheets

| Domain | IP Address |
|---|---|
| mail.google.com | 172.217.6.37 |
| googlemail.l.google.com | 172.217.6.37 |
| v10.vortex-win.data.microsoft.com | 64.4.54.254 |
| login.windows.net | 23.100.32.138 |
| nexusrules.officeapps.live.com | 52.109.120.18 |
| play.google.com | 172.217.6.46 |
| ... | ... |

Destination IP Address and Top-Level Domain Extracted from Data Packet
301

| Second-Level Domain (SLD) | IP Address |
|---|---|
| google.com | 172.217.6.37 |
| microsoft.com | 64.4.54.254 |
| windows.net | 23.100.32.138 |
| live.com | 52.109.120.18 |
| google.com | 172.217.6.46 |
| ... | ... |

Destination IP Address to Second-Level Domain Database
302

| Application | Second-Level Domain (SLD) |
|---|---|
| Google-Gmail | gmail.com |
| Microsoft-Office365 | office365.com |
| Cisco-WebEx | webex.com |
| Amazon-AWS | amazonaws.com |
| Amazon-Web | amazon.com |
| ... | ... |

Second-Level Domain to Cloud-Based Application Database
303

DNS (DOMAIN NAME SERVER)-BASED APPLICATION-AWARE ROUTING ON SD-WAN (SOFTWARE-DEFINED WIDE ACCESS NETWORK)

FIELD OF THE INVENTION

The invention relates generally to computer networking, and more specifically, to improving network hardware performance by using DNS-based application awareness in a SD-WAN for link quality selection.

BACKGROUND

SD-WAN (Software-Defined WAN) provides dynamic mechanisms for enterprises to optimally use their available WAN links. It can simplify the deployment, management and operation of WAN infrastructure and allow enterprises to build higher performance WAN using lower cost Internet connections, which can partially or wholly replace more expensive private WAN connections.

To maximize the performance of application traffic delivery with SD-WAN, SD-WAN should have the capabilities of application awareness/identification and giving bandwidth priority to the most business-critical applications. This includes dynamic WAN link selection, delivering an application on a faster link, or even splitting an application on two or more links to improve the delivery performance.

Generally speaking, there are two kinds of application awareness/identification techniques used by products on the market. One technique is the packet-content-based application detection, the other is the IP/Port-based application detection.

DPI (deep packet inspection) technique is often used in the packet-content-based application identification. Its advantage is that it can provide more accurate application identification because the application traffic detection is based on the predefined characteristics chosen from the application's packets. The vendor of this solution needs to build a predefined application signature database for its products and update it regularly to keep its effectiveness due to the application changes or the emerging of new applications. So, the effectiveness of this method is high. However, its weakness is that its performance is low because the content of each packet needs to be inspected against the predefined application signature database consisting of tens of thousands of signatures. So, this method isn't suitable for the networks which require high performance communication.

The IP/Port-based application identification is simple. It assumes that the application runs on servers with fixed IP addresses and port numbers. Its advantage is that it can provide fast application identification because only packet header (destination IP address and port number) is checked against the predefined application database. The vendor of this solution needs to build a predefined application database consisting of fixed IP addresses and port numbers of the supported applications for its products and update it regularly to keep its effectiveness. So, the performance of this method is high. However, its weakness is that its effectiveness is low because it's hard to collect and build such application signature database with high quality due to CDN (Content Delivery Network) and Load Balancing techniques being used for online applications by many companies.

A CDN is a geographically distributed network of proxy servers. Its goal is to distribute service using the server spatially close to end-users to provide high availability and high performance user experience. CDNs serve a large portion of the Internet content today. For the vendor of the IP/Port-based application identification solution, it's impossible to know/collect all the IP addresses of the application using global CDN.

Load Balancing technique aims to optimize resource use, maximize throughput, minimize response time, and avoid overload of any single resource. It distributes workloads across multiple computing resources. Some vendors like Google implement more complicated Load Balancing technique. Its HTTP and HTTPS traffic can be balanced across multiple backend instances, across multiple regions. This means that different applications can share the same IP addresses. Their Load Balancing server can differentiate them by the domain name. For the vendor of the IP/Port-based application identification solution, it's very hard to differentiate the applications with fixed IP addresses.

What is needed is a robust technique for selecting link quality for SD-WAN from DNS-based application-awareness.

SUMMARY

To meet the above-described needs, methods, computer program products, and systems for selecting link quality for SD-WAN from DNS-based application-awareness.

In one embodiment, network data packets generated from cloud-based application communication between a station on the Wi-Fi network and an application server located remote from the Wi-Fi network are received. The application associated with the network data packet is identified by parsing the network data packet header of the received network data packets to identify a second-level domain from a destination IP address and searching the second-level domain database to identify the application associated with the second-level domain.

It is determined whether the network data packet comprises a DNS packet or a non-DNS packet. Responsive to the network data packet comprising a DNS packet, a second-level domain database in real-time is updated by storing the destination IP address in association with the second-level domain, the second-level domain associated with the application. Responsive to the network data packet comprising a non-DNS packet, a network policy for enforcement on the identified application and routing the network data packet in accordance with the network policy for the application is identified.

The network packet transmissions are routed over the data communication network corresponding to the DNS determination.

Advantageously, network performance is improved with better performance towards QoS requirements. Additionally, network computer hardware performance, and network performance, are improved within more efficient processing of network packets.

BRIEF DESCRIPTION OF THE DRAWINGS

In the following drawings, like reference numbers are used to refer to like elements. Although the following figures depict various examples of the invention, the invention is not limited to the examples depicted in the figures.

FIGS. 3A-3B are example screenshots of processing for destination IP addresses, according to some embodiments.

DETAILED DESCRIPTION

Methods, computer program products, and systems for DNS-based application-awareness routing.

To solve the problems existing in the packet-content-based and IP/Port-based application identification techniques, we bring up the DNS-based application identification method. In this solution, only all DNS response packets which contain domain name and its corresponding IP address are inspected. By parsing the DNS response packets, a database can be built dynamically and it consists of many domain-IP pairs. In this solution, applications are identified by their domains. Based on the dynamic domain-IP database, applications are finally identified by their IP addresses.

Compared with the packet-content-based application identification method, the performance of this new solution is much higher since only DNS response packets are inspected in depth. Compared with the IP/Port-based application identification method, the effectiveness of this new solution is much higher since the destination IP addresses are obtained from the real-time traffic in current network. Furthermore, the application signature package used by this new solution could be much smaller than the ones used by other solutions.

Figure 1:
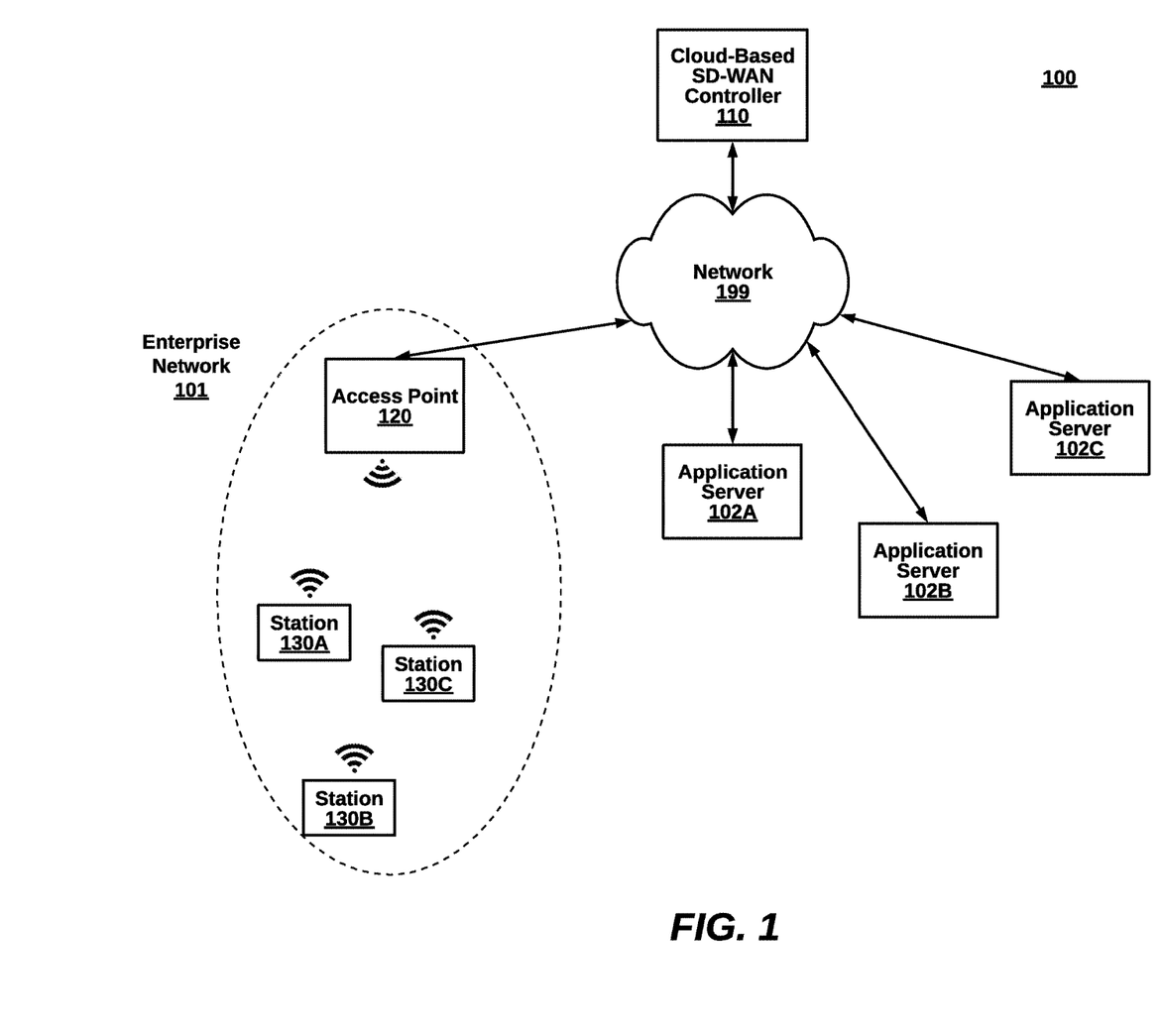
FIG. 1 is a high-level block diagram illustrating a system for DNS-based application-awareness routing, according to one embodiment.
Figure 2A:
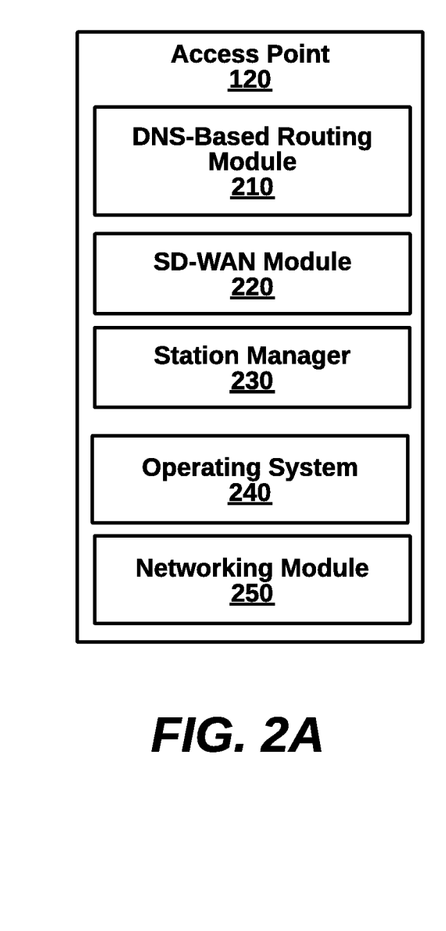
FIGS. 2A-B are more detailed block diagram illustrating an example access point of the system of FIG. 1, according to one embodiment.
Figure 2B:
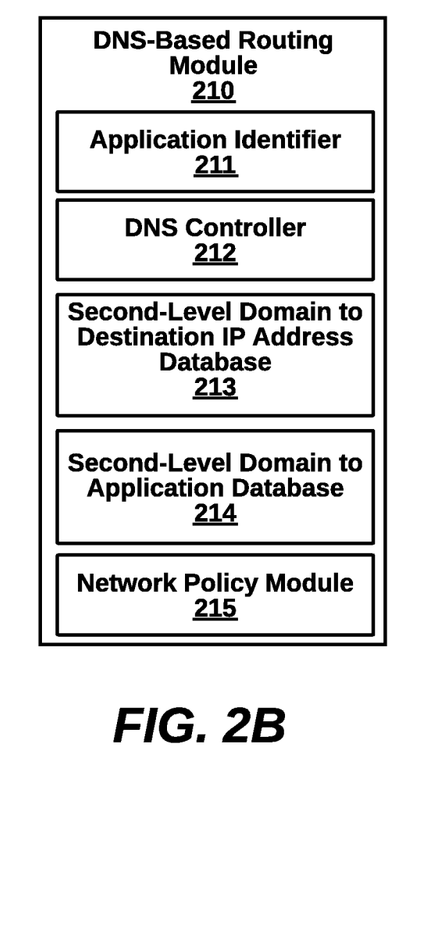
Figure 3B:
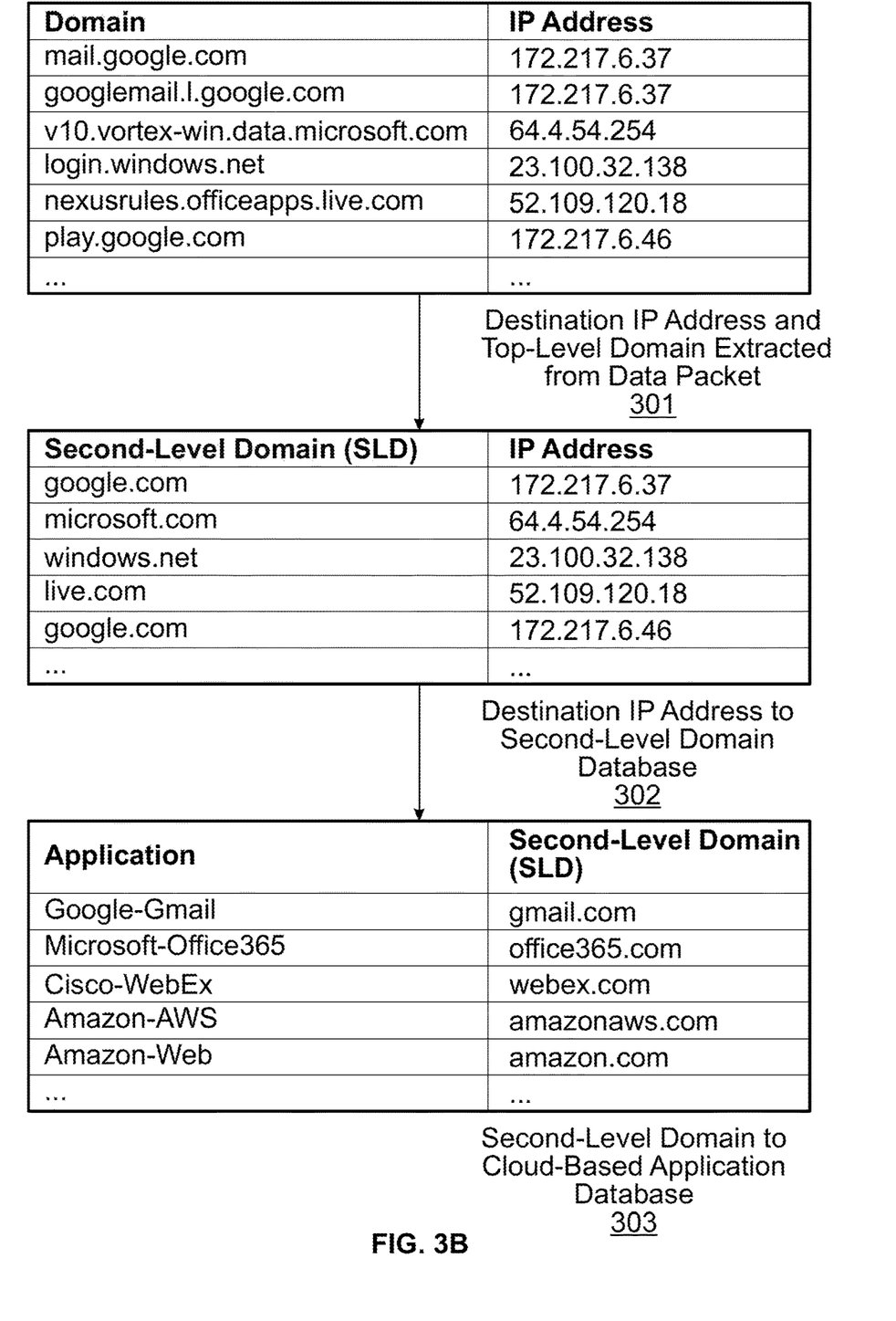

Systems for DNS-Based Application-Awareness Routing (FIGS. 1-3)

FIG. 1 is a high-level block diagram illustrating a system for DNS-based application-awareness routing, according to one embodiment. The system 100 includes an enterprise LAN 101 and cloud-based application servers 102A-C. The enterprise LAN 101 has cloud-based SD-WAN controller 110, access point 120, and stations 130A-C. Other embodiments of the system 100 can include additional network components that are not shown in FIG. 1. For example, there can be multiple enterprise LANs, a Wi-Fi controller managing access points and a different number of application servers, more access points, and more stations. There can also be network devices such as switches, routers, fire walls, proxy servers, and other network architectures.

In an embodiment, the stations 130A-C access resources on the cloud-based application severs 102A-C. For instance, a mobile phone can access G-Mail, a San Jose office of an entity can access files at the Chicago office. To accommodate these services, the enterprise LAN 101 is communicatively coupled to the cloud-based application servers 102A-C over the network 199, along with the cloud-based SD-WAN controller 110. The access point 120 is also preferably connected by wire to the network 199 and connected wirelessly to the stations 130A-C. The network 199 can comprise a data communication network such as the Internet, WAN (wide area network), VLAN (virtual local access network), a LAN (local access network), a cellular network (e.g., 3G, 4G or 5G), or a hybrid network.

In one embodiment, the access point 120 routes application traffic for stations 130A-C utilizing cloud-based application. For instance, G-Mail and Office365 may be assigned high quality WAN link 1 while other traffic may be assigned to a lower quality WAN link 2. Routing in SD-WAN is application-aware, and is governed in part by network policies implemented by the access point. The network policies can be set by network administrators or automatically by applications. Once an application has been identified using up-to-date DNS information, the network policy can discriminate better services for business-critical applications relative to non-critical applications, such as social media. The DNS information is constantly updated by extracting destination IP information from DNS-packets and storing the extracted destination IP information in association with a second-level domain. In this way, the second-level domain is an abstraction of multiple and dynamic IP addresses for applications run over the cloud.

Figure 6:
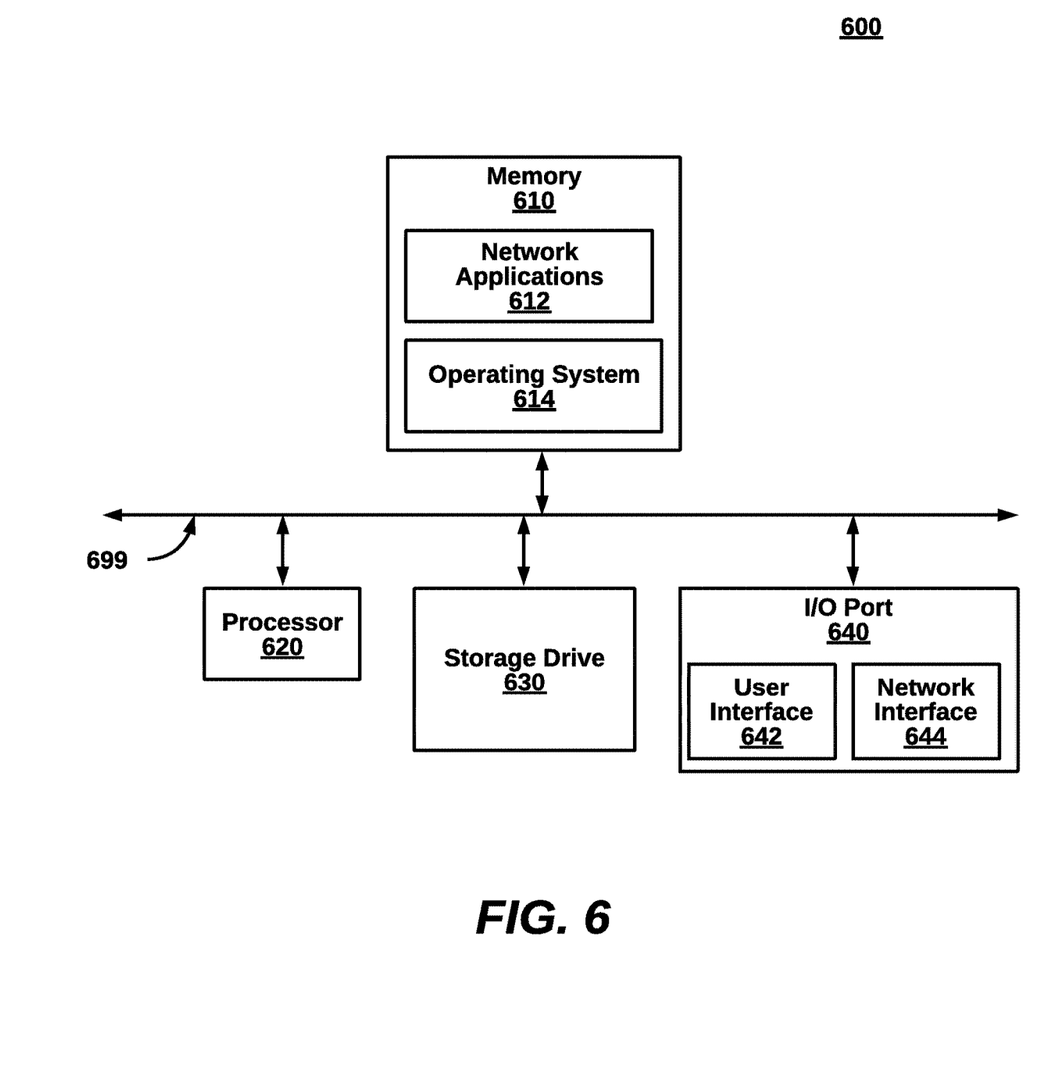
FIG. 6 is a block diagram illustrating an example computing device, according to one embodiment.

Some embodiments of the access point 120 operates SD-WAN without a higher-level cloud-based SD-WAN controller 110. Other embodiments have varying levels of cooperation and off-loading. The access point 120 can be any of the computing devices, such as a personal computer, a server blade, any computing environment as shown in FIG. 6. For example, the AP 101 can be an Access Point—Model 101 or an Access Point—Model 433 (modified as discussed herein) by Fortinet, Inc. The access point 120 is described in more detail in association with FIG. 2.

SD-WAN control functionality can also be implemented in a Wi-Fi controller (not pictured for simplicity, as an optional network device that manages multiple access points. Data received from the multiple access points allows the Wi-Fi controller to have a network-wide view of activity. Some decisions are applied by the Wi-Fi controller locally at the access points based on non-local data and non-local parameters. The Wi-Fi controller can also run applications (e.g., SDN or Software-Defined Networking applications). The Wi-Fi controller can be, for example, an MC1500 or MC6000 device by Fortinet, Inc. of Sunnyvale, Calif.

The stations 130A-C(or mobile station, STA, client or wireless device) can be, for example, a personal computer, laptop computer, tablet computer, smart phone, mobile computing device, Internet appliance, end station or any other computing device as described in FIG. 6. The stations 130A-C wirelessly couple to APs using a radio and antenna. No pre-configuration or client is needed. The stations 130A-C operate according to wireless standards such as IEEE 802.11a, b, g, n, ac, w or any other wireless standard. The stations 130A-C can send and receive network packets for applications being executed.

Located remotely from the enterprise network 101, the cloud-based application servers 102A-C can be data centers, such as AWS (Amazon Web Services). The application severs 102A-C can be a SaaS (software-as-a-service) that offloads processing to resources in the cloud. Mobile apps executing on smart phones, for example, can log into bank accounts or stock trading accounts to perform important tasks from a small portal.

FIG. 2A is a more detailed block diagram illustrating the access point 120 of the system 100 of FIG. 1, according to one embodiment. The access point 120 includes a DNS-based routing module 210, an SD-WAN module 220, a station management module 230, an operating system 240, and connection ports 250. The components can be implemented in hardware, software, or a combination of both. Alternative implementations are possible.

The DNS-based routing module 210, as shown in FIG. 2B, further comprises an application identifier 211, a DNS controller 212, a second-level domain to destination IP address database 213, a second-level domain to application database 214, and a network policy module 215. In other embodiments, the databases 213, 214 are located on a remote server operated by a third-party.

In operation, the application identifier 211 can determine an application by using a destination IP address extracted from a network packet, identifying a second-level domain associated with the destination IP address, and locating an application associated with the second-level domain. Network policies differentiate treatment of applications. In some cases, application identification fails.

Additionally, the DNS controller 212 examines data parsed from application data traffic handled by the access point 120 as shown in FIG. 3A. In an implementation, if the DNS controller 212, after examining header data in a network packet, identifies a DNS response type of network packet, the destination IP (and machine identifier in some cases for more accuracy) is stored in the second-level domain to destination IP address database 213. Destination IP addresses are collected under second-level domains as shown in FIG. 3B, 301, 302, 303. As a result, variations in destination IP addresses will not hinder application identification. On the other hand, if the DNS controller 212 identifies a non-DNS response type of network packet, such as a data packet passing application data, a network policy can be checked for managing transmission of the network data packet. For example, high priority applications can have more favorable network treatment than medium or low priority applications, with respect to bandwidth, contention window settings, QoS (quality of service), and the like. Some embodiments bypass this examination for network packets of an existing session that has already been assigned a policy-based link for cloud-based application traffic.

Next in FIG. 2, the SD-WAN module 220 implements SD-WAN compatibility to the access point 120. To this end, local control of the control plane layers of the network protocol are surrendered by the stations 110A-C for centralized management. Network-wide considerations can be implemented into local routing decisions under the SD-WAN network architecture. However, the local control of the data plane layers of the network protocols are maintained by the stations 110A-C for local management.

The station management module 230 manages station connections by advertising beacons, receiving probe request, sending probe responses and other management frames. Further, individual stations can be tracked as to bandwidth usage, QoS, BSSID assignment, and the like. Beacons and probe responses can also be modified by the station management module 230 to include channel switch announcement information.

The operating system 240 interfaces between the software and hardware of the access point 120. The operating system 240 can also include integrated applications.

Finally, for the embodiment of FIG. 2, the networking module 250 includes connection ports and networking hardware and software for exchanging network packets over the channel.

Figure 4:
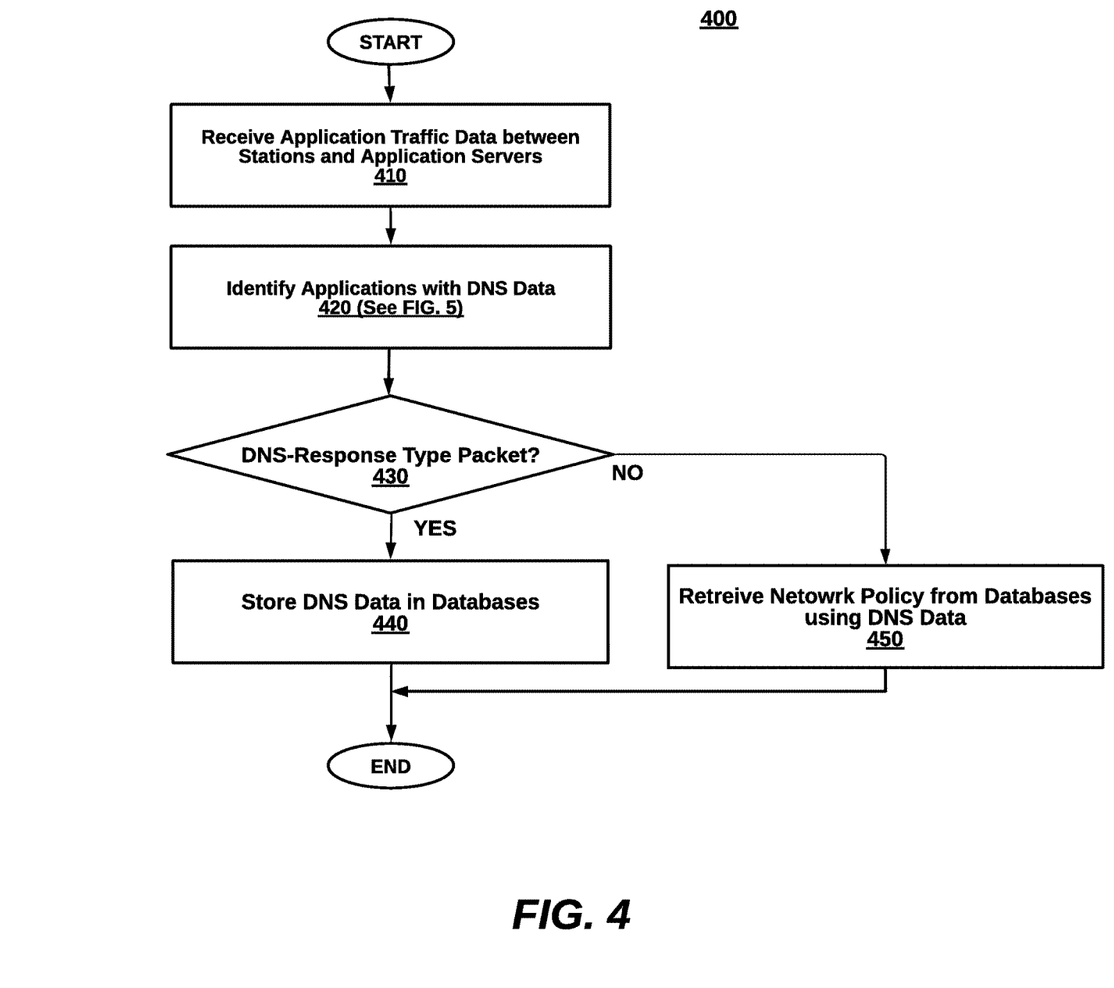
FIG. 4 is a high-level flow diagram illustrating a method for DNS-based application-awareness routing, according to one embodiment.
Figure 5:
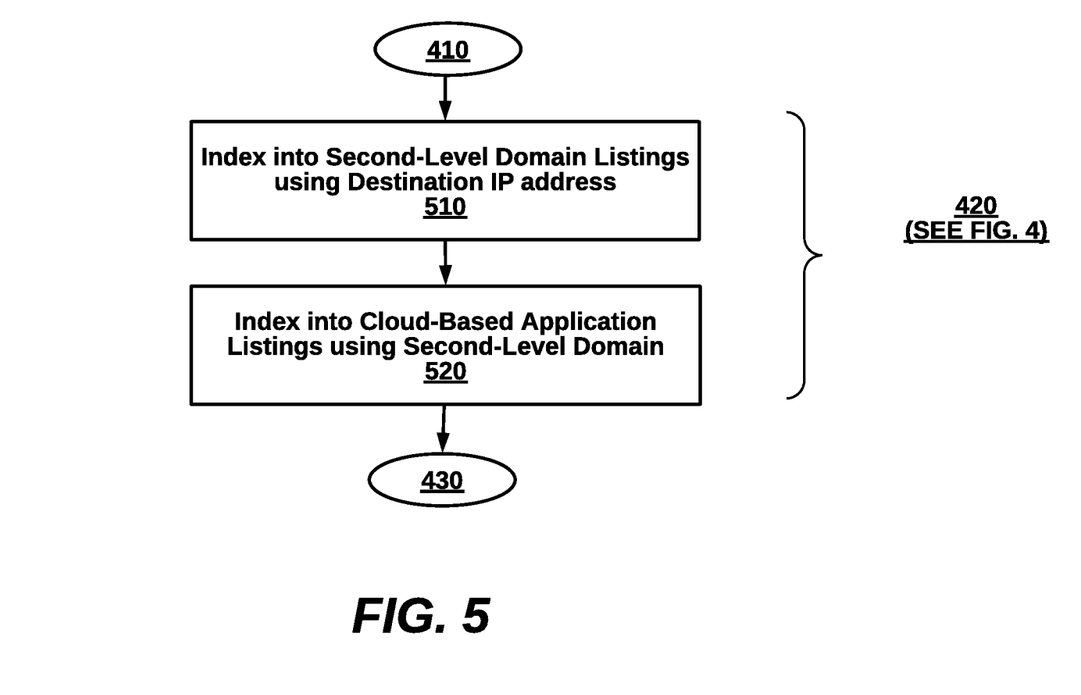
FIG. 5 is a more detailed flow diagram illustrating a step of DNS-based identification of applications, from the method of FIG. 4, according to one embodiment.

Methods for DNS-Based Application-Awareness Routing (FIGS. 4-5)

FIG. 4 is a high-level flow diagram illustrating a method 400 for DNS-based application-awareness routing, according to one embodiment. The method 400 can be implemented by, for example, the access point 120 of FIG. 1.

At step 410, network data packets are received from a plurality of sessions and associated with application traffic between a plurality of transmitting Wi-Fi stations on the Wi-Fi network and remotely-located application servers (or remotely-located LANs of a single enterprise). The received data packets contend for access for transmission on the data communication network and are processed based on a network policy for the application.

Thus, at step 420, applications associated with network packets are identified with DNS data such as destination IP address, as set forth in more detail below with respect to FIG. 5. In other embodiments, the application is only identified for non-DNS packets.

It is determined, at step 430, whether network packets are DNS response-type packets or non-DNS response-type packets. In general, DNS packets primarily use UDP (user datagram protocol) on port 53 to serve requests. DNS queries can consist of a single UDP request from a client followed by a single UDP reply (i.e., DNS-response) from a server. If a DNS response-type packet, at step 440, databases are updated to track the association between destination IP address in a database. If not a DNS response-type packet, at step 450, databases are checked according to a destination IP address to identify cloud-based application. Furthermore, a network policy can be accessed for a particular one of the cloud-based applications, such as a firewall policy.

FIG. 5 is a more detailed flow diagram illustrating an example of the step 420 of method 400 for identifying applications from destination IP address, according to one embodiment. Other embodiments are possible.

At step 510, a destination IP address is extracted from a network packet from a station to an application server. The source IP address is used as an index into a database to find an associated second-level domain. Each second-level domain can be referred to by multiple IP addresses. In turn, at step 520, the second-level domain exposes an application. In some embodiments, these associations are updated in real-time by DNS response packets processed by the same access point or other network devices under the same SD-WAN compatibility infrastructure.

This solution addresses weaknesses of both content-sniffing application identification as well as IP port application identification.

Generic Computing Device (FIG. 6)

FIG. 6 is a block diagram illustrating an exemplary computing device 600 for use in the system 100 of FIG. 1, according to one embodiment. The computing device 600 is an exemplary device that is implementable for each of the components of the system 100, such as the cloud-based SD-WAN controller 110, the access point 120, and the stations 130A-C. Additionally, the computing device 600 is merely an example implementation itself, since the system 100 can also be fully or partially implemented with laptop computers, tablet computers, smart cell phones, Internet appliances, and the like.

The computing device 600, of the present embodiment, includes a memory 610, a processor 620, a hard drive 630, and an I/O port 640. Each of the components is coupled for electronic communication via a bus 699. Communication can be digital and/or analog, and use any suitable protocol.

The memory 610 further comprises network applications 612 and an operating system 614. The network applications 612 can include the modules of network applications. Other network applications can include 612 a web browser, a mobile application, an application that uses networking, a remote application executing locally, a network protocol application, a network management application, a network routing application, or the like.

The operating system 614 can be one of the Microsoft Windows® family of operating systems (e.g., Windows 96, 98, Me, Windows NT, Windows 2000, Windows XP, Windows XP x64 Edition, Windows Vista, Windows CE, Windows Mobile, Windows 6 or Windows 10), Linux, HP-UX, UNIX, Sun OS, Solaris, Mac OS X, Alpha OS, AIX, IRIX32, or IRIX64. Other operating systems may be used. Microsoft Windows is a trademark of Microsoft Corporation.

The processor 620 can be a network processor (e.g., optimized for IEEE 802.11), a general-purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 620 can be single core, multiple core, or include more than one processing elements. The processor 620 can be disposed on silicon or any other suitable material. The processor 620 can receive and execute instructions and data stored in the memory 610 or the hard drive 630.

The storage device 630 can be any non-volatile type of storage such as a magnetic disc, EEPROM, Flash, or the like. The storage device 630 stores code and data for applications.

The I/O port 640 further comprises a user interface 642 and a network interface 644. The user interface 642 can output to a display device and receive input from, for example, a keyboard. The network interface 644 connects to a medium such as Ethernet or Wi-Fi for data input and output. In one embodiment, the network interface 644 includes IEEE 802.11 antennae.

Many of the functionalities described herein can be implemented with computer software, computer hardware, or a combination.

Computer software products (e.g., non-transitory computer products storing source code) may be written in any of various suitable programming languages, such as C, C++, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

I claim:

1. A computer-implemented method in an access point communicatively coupled to a data communication network and also communicatively coupled to a Wi-Fi network, the method for routing network packets in an SD-WAN utilizing DNS-based application-awareness, the method comprising the steps of:
   receiving network data packets generated from cloud-based application communication between a station on the Wi-Fi network and an application server located remote from the Wi-Fi network, at a network interface of the access point, from the data communication network;
   identifying, from a memory storing a second-level domain database, the application associated with the network data packet by parsing a header of the network data packet of the received network data packets to identify a second-level domain from a destination IP address and searching the second-level domain database to identify the application associated with the second-level domain;
   determining, using a processor of the access point, whether the network data packet comprises a DNS packet or a non-DNS packet:
      responsive to the network data packet comprising a DNS packet, updating a second-level domain database in real-time by storing the destination IP address in association with the second-level domain, the second-level domain associated with the application;
      responsive to the network data packet comprising a non-DNS packet, identifying a network policy for enforcement on the identified application and routing the network data packet in accordance with the network policy for the application;
   transmitting, from the network interface, the network packet routing over the data communication network corresponding to the DNS determination.

2. The method of claim 1, wherein the network policy comprises a description of network resource usage.

3. The method of claim 1, wherein the network policy is part of a plurality of network policies, each network policy corresponding to a specific application from a plurality of applications.

4. The method of claim 1, wherein the application comprises at least one of: an e-mail application, a word processing application, and a social media application.

5. The method of claim 1, further comprising:
determining, prior to the DNS determination step, whether the network packet belongs to an existing session or to a new session, and responsive to the network packet belonging to the existing session, identify the application from a session cache.

6. A method of claim 1, wherein the application server is located on a second enterprise network, wherein the enterprise network and the second enterprise network are under control of a common entity.

7. A non-transitory computer-readable medium storing instructions that, when executed by a processor, perform a computer-implemented method in an access point communicatively coupled to a data communication network and also communicatively coupled to a Wi-Fi network, the method for selecting network links in an SD-WAN utilizing DNS-based application-awareness, the method comprising the steps of:
receiving network data packets generated from cloud-based application communication between a station on the Wi-Fi network and an application server located remote from the Wi-Fi network, at a network interface of the access point, from the data communication network;
identifying, from a memory storing a second-level domain database, the application associated with the network data packet by parsing the network data packet of the received network data packets to identify a second-level domain from a destination IP address and searching the second-level domain database to identify the application associated with the second-level domain;
determining, using a processor of the access point, whether the network data packet comprises a DNS packet or a non-DNS packet:
responsive to the network data packet comprising a DNS packet, updating a second-level domain database in real-time by storing the destination IP address in association with the second-level domain, the second-level domain associated with the application;
responsive to the network data packet comprising a non-DNS packet, identifying a network policy for enforcement on the identified application and routing the network data packet in accordance with the network policy for the application;
transmitting, from the network interface, the network packet routing over the data communication network corresponding to the DNS determination.

* * * * *